US012677202B2

(12) United States Patent
Singh

(10) Patent No.: US 12,677,202 B2
(45) Date of Patent: Jul. 7, 2026

(54) TROPOSPHERIC DUCTING INTERFERENCE MITIGATION THROUGH UE MODE SWITCHING

(71) Applicant: T-MOBILE INNOVATIONS LLC, Overland Park, KS (US)

(72) Inventor: Jasinder Pal Singh, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 376 days.

(21) Appl. No.: 18/394,186

(22) Filed: Dec. 22, 2023

(65) Prior Publication Data

US 2025/0211412 A1      Jun. 26, 2025

(51) Int. Cl.
| | |
|---|---|
| *H04W 36/20* | (2009.01) |
| *H04W 72/0453* | (2023.01) |
| *H04W 72/23* | (2023.01) |
| *H04W 72/541* | (2023.01) |

(52) U.S. Cl.
CPC ....... *H04W 36/20* (2013.01); *H04W 72/0453* (2013.01); *H04W 72/23* (2023.01); *H04W 72/541* (2023.01)

(58) Field of Classification Search
CPC . H04W 36/20; H04W 72/0453; H04W 72/23; H04W 72/541
See application file for complete search history.

(56) References Cited

U.S. PATENT DOCUMENTS

| | | | |
|---|---|---|---|
| 2020/0344619 A1* | 10/2020 | Gormley | H04L 5/0073 |
| 2021/0176105 A1* | 6/2021 | Fei | H04L 5/0048 |
| 2022/0150012 A1* | 5/2022 | Su | H04B 17/26 |

FOREIGN PATENT DOCUMENTS

| | | | | |
|---|---|---|---|---|
| JP | 2002010339 A | * | 1/2022 | H04W 48/18 |

* cited by examiner

*Primary Examiner* — Kevin C. Harper
(74) *Attorney, Agent, or Firm* — SHOOK, HARDY & BACON L.L.P.

(57) ABSTRACT

Methods for mitigating the effects of an atmospheric-based interference event on the propagation of a radio frequency (RF) signal are provided. A wireless communication network may determine that tropospheric ducting is occurring, causing radio frequencies to travel much further than anticipated. In response to the determination of tropospheric ducting interference (TDI), a user equipment (UE) connected a victim base station using standalone time domain duplexing (TDD) may be instructed to at least partially shift communications to using frequency domain duplexing (FDD). When TDI is reduced, the UE is notified the victim base station has been enabled to communicate using standalone TDD.

20 Claims, 5 Drawing Sheets

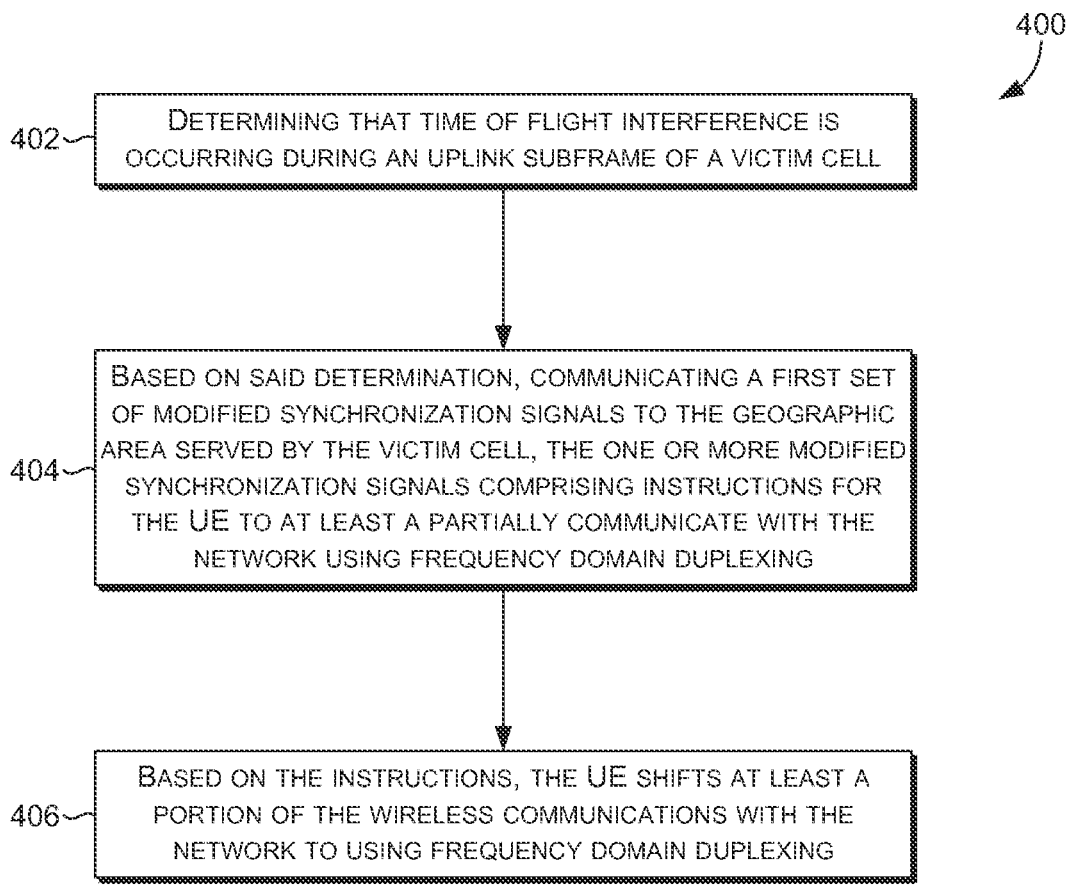

400

402 — DETERMINING THAT TIME OF FLIGHT INTERFERENCE IS OCCURRING DURING AN UPLINK SUBFRAME OF A VICTIM CELL

404 — BASED ON SAID DETERMINATION, COMMUNICATING A FIRST SET OF MODIFIED SYNCHRONIZATION SIGNALS TO THE GEOGRAPHIC AREA SERVED BY THE VICTIM CELL, THE ONE OR MORE MODIFIED SYNCHRONIZATION SIGNALS COMPRISING INSTRUCTIONS FOR THE UE TO AT LEAST A PARTIALLY COMMUNICATE WITH THE NETWORK USING FREQUENCY DOMAIN DUPLEXING

406 — BASED ON THE INSTRUCTIONS, THE UE SHIFTS AT LEAST A PORTION OF THE WIRELESS COMMUNICATIONS WITH THE NETWORK TO USING FREQUENCY DOMAIN DUPLEXING

*FIG. 4*

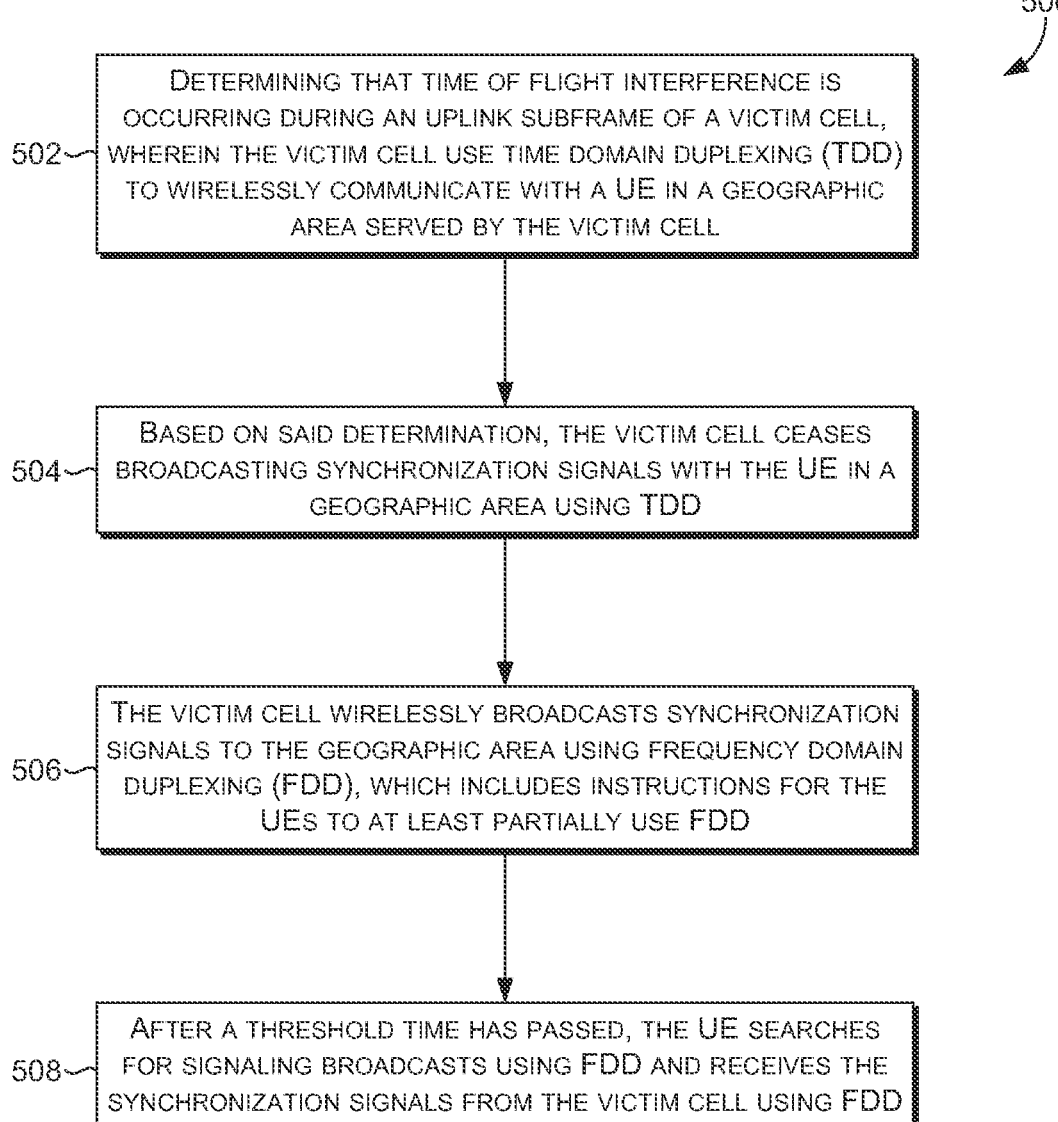

500

502 — DETERMINING THAT TIME OF FLIGHT INTERFERENCE IS OCCURRING DURING AN UPLINK SUBFRAME OF A VICTIM CELL, WHEREIN THE VICTIM CELL USE TIME DOMAIN DUPLEXING (TDD) TO WIRELESSLY COMMUNICATE WITH A UE IN A GEOGRAPHIC AREA SERVED BY THE VICTIM CELL

504 — BASED ON SAID DETERMINATION, THE VICTIM CELL CEASES BROADCASTING SYNCHRONIZATION SIGNALS WITH THE UE IN A GEOGRAPHIC AREA USING TDD

506 — THE VICTIM CELL WIRELESSLY BROADCASTS SYNCHRONIZATION SIGNALS TO THE GEOGRAPHIC AREA USING FREQUENCY DOMAIN DUPLEXING (FDD), WHICH INCLUDES INSTRUCTIONS FOR THE UEs TO AT LEAST PARTIALLY USE FDD

508 — AFTER A THRESHOLD TIME HAS PASSED, THE UE SEARCHES FOR SIGNALING BROADCASTS USING FDD AND RECEIVES THE SYNCHRONIZATION SIGNALS FROM THE VICTIM CELL USING FDD

FIG. 5

TROPOSPHERIC DUCTING INTERFERENCE MITIGATION THROUGH UE MODE SWITCHING

SUMMARY

The present disclosure is directed to mitigating time of flight interference, substantially as shown and/or described in connection with at least one of the Figures, and as set forth more completely in the claims.

According to various aspects of the technology, tropospheric weather conditions can cause radio signals associated with a wireless communication network to travel farther than intended, to a location or area that is undesirable. This time of flight interference causes degraded user experiences at the distant, victim cell. To mitigate this time of flight interference, the multiple user equipment (UE) may be signaled to shift from operating in a standalone mode using Time Domain Duplexing (TDD) to a dual-connectivity mode using TDD and Frequency Domain Duplexing (FDD). The UEs may then be signaled to operate in a standalone FDD mode, depending on networks conditions. When time of flight interference is ceased or reduced, UEs may be signaled to switch back to standalone TDD mode.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein:

FIG. 4 depicts a flow diagram of a first method for mitigating tropospheric ducting interference in a wireless telecommunication network in accordance with aspects herein; and FIG. 5 depicts a flow diagram of a second method for mitigating tropospheric ducting interference in a wireless telecommunication network in accordance with aspects herein.

DETAILED DESCRIPTION

Figure 1:
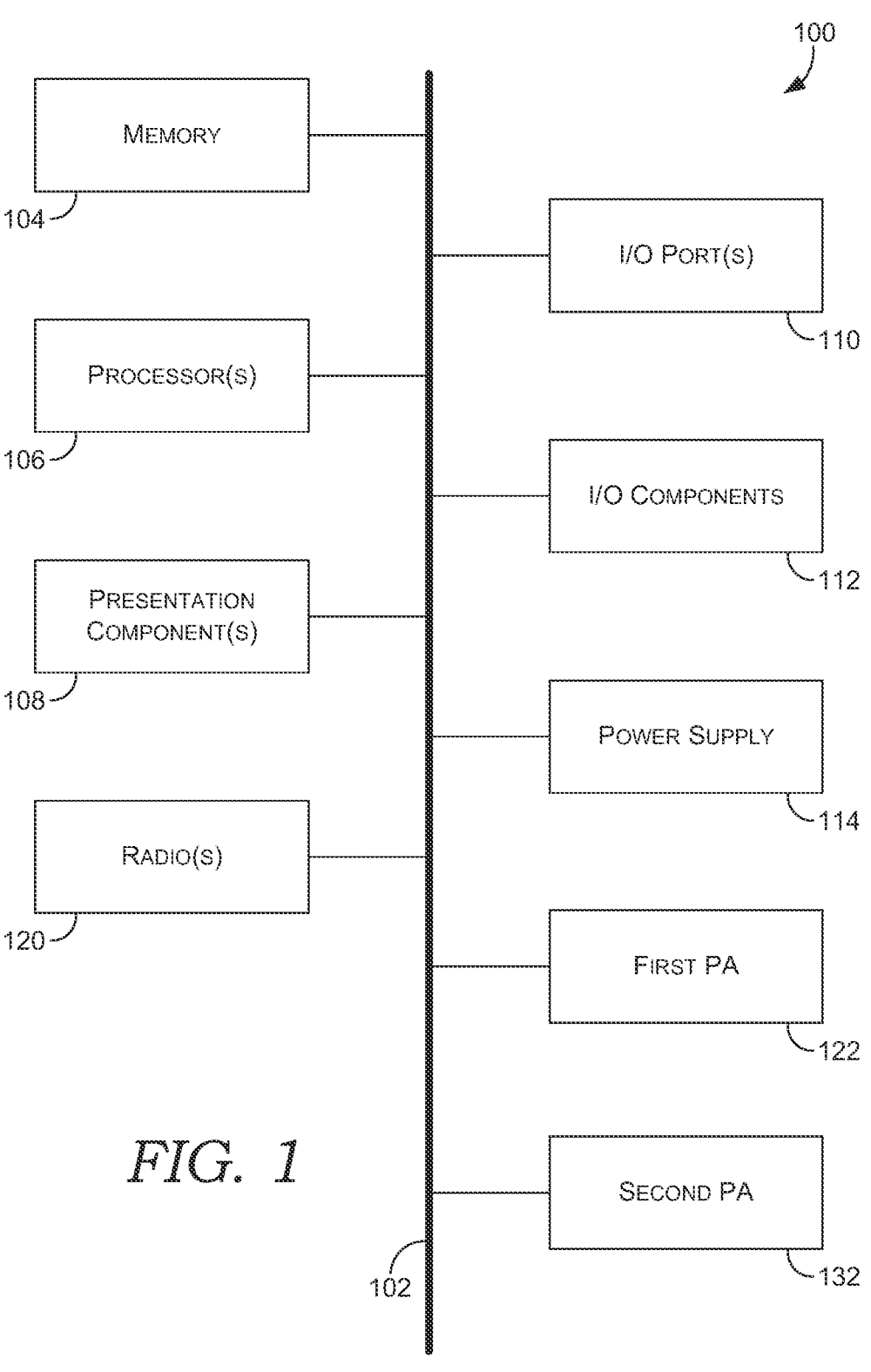
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to network access technology for the provision of wireless telecommunication services from a base station to one or more electronic devices, such as an eNodeB, gNodeB, etc. The term "cell" is used to describe one or more hardware and software components of a base station that are configured to provide wireless communication service to a geographic area.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, time of flight interference is a condition wherein radio frequency signals associated with a wireless communication network are realized in a location or area that is undesirably distant from its transmitter. In some instances, signals from a transmitter that are intended to travel 10 miles or less may travel for dozens or hundreds of miles. One cause of time of flight interference is tropospheric ducting. Tropospheric ducting is a meteorological phenomenon whereby layers of warm and cold air form at different altitudes. When a layer of warm air is trapped between two layers of cold air, a duct of warm air is created. Radio frequency signals become trapped in the duct of warm air, causing them to travel a greater distance than they would under normal conditions. This can result in interference and a degraded experience for users. Network operators prefer to keep user equipment connected using a TDD frequency such as the n41 layer because it offers higher bandwidth capacity. However, there is a potential for tropospheric ducting when using TDD. The present disclosure describes changing the idle mode cell re-selection priorities of UEs experiencing time of flight interference from TDD to Frequency Division Duplexing (FDD) (e.g., n71, b2, b66, n25) to mitigate ducting interference and preserve user experiences. When time of flight interference is reduced and tropospheric ducting is no longer occurring, the idle mode cell reselection priorities of UEs may be switched back to give TDD higher priority.

Conventionally, systems and methods capable of addressing radio frequency signal interference resulting from tropospheric ducting include weather forecasting potential tropospheric ducting events and taking measures to optimize network configurations in order to temporarily minimize interference during the events. Specifically, when weather conditions are ideal one or more antennas on a base station may be tilted to avoid intercepting interfering frequencies from a distant base station, or the amount of transmitting power used by an antenna to maintain a stable link may be adjusted. The adjustments that can be made to the network configurations are limited, however. Operators must work within certain limitations of the wireless network. In addition, the nature of tropospheric ducting is unstable. Tropospheric ducting is highly dependent on weather conditions and atmospheric temperature profiles. It can occur unexpectedly and is challenging to predict accurately. This unpredictability can make it difficult to plan and manage wireless communication systems effectively. Even if predicted or detected quickly and accurately, because conventional solutions to mitigating time of flight interference in a cell involve reconfigurations of antenna or signal propagation characteristics, they are slow to implement, imprecise, and may have undesirably inadvertent consequences (e.g., reducing an area served by a cell due to a downtilt).

Unlike conventional solutions, the present disclosure describes detecting increased interference during the uplink subframe of a network using a Time Domain Duplexing method of duplex communication (TDD) and changing the idle mode cell re-selection priorities of user equipment to give Frequency Domain Duplexing (FDD) bands higher priority over TDD bands for affected cells. During tropospheric weather events, interference can be experienced in the uplink traffic of TDD bands, which use the same frequency for uplink and downlink. Interference from tropospheric ducting will specifically occur when TDD switches from downlink to uplink after a guard period. Therefore, when interference occurs at the beginning of the uplink subframe and reduces in the remaining frame, the interference may be attributable to tropospheric ducting. To mitigate this interference, when interference is detected at the beginning of the uplink and reduces in the remaining sub-frame, the idle mode cell re-selection priorities are changed to give FDD bands higher priorities for affected cells—causing a UE to select and camp on to an FDD cell instead of the TDD cell affected by the time of flight interference. The present disclosure also describes changing the idle mode cell re-selection priorities back to TDD over FDD once the tropospheric phenomenon is reduced.

Accordingly, a first aspect of the present disclosure provides a system for mitigating interference caused by a meteorological condition known as tropospheric ducting in a wireless communication network. The system comprises one or more computer processing components configured to perform operations. The operations comprises first determining that time of flight interference is occurring during an uplink subframe of a victim cell, wherein the victim cell uses time domain duplexing to wirelessly communicate with a UE in a geographic area served by the victim cell. The operations next comprises, based on said determination, communicating a first set of modified synchronization signals to the geographic area served by the victim cell, the modified synchronization signals comprising one or more cell selection values that cause the UE to select a second cell over the victim cell.

A second aspect of the present disclosure provides a system for mitigating interference caused by a meteorological condition known as tropospheric ducting in a wireless communication network. The system comprises one or more computer processing components configured to perform operations. The operations comprises first determining that time of flight interference is occurring during an uplink subframe of a victim cell, wherein the victim cell uses time domain duplexing (TDD) to wirelessly communicate with a UE in a geographic area served by the victim cell. The operation next comprises, based on said determination, communicating a first set signals to the geographic area served by the victim cell, the signals comprising one or more instructions that cause the UE to shift to frequency domain duplexing (FDD) to wirelessly communicate while in the geographic area.

Another aspect of the present disclosure is directed to a non-transitory computer readable media having instructions stored thereon that, when executed by one or more computer processing components, cause the one or more computer processing components to perform a method for mitigating interference caused by a meteorological condition known as tropospheric ducting in a wireless telecommunication network. The method comprises determining that time of flight interference is occurring during an uplink subframe of a victim cell, wherein the victim cell uses time domain duplexing (TDD) to wirelessly communicate with a UE in a geographic area served by the victim cell. The method further comprises, based on said determination, communicating a first set of signals to the geographic area served by the victim cell, the signals comprising one or more instructions that causes the UE to operate in a dual mode, using TDD and frequency domain duplexing (FDD).

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g., a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VOLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

As used herein the term "LTE" refers to the 4G Long-Term Evolution standard for cellular network. Additionally, as used herein the term "5G" refers to the 5G is the fifth-generation technology standard for cellular networks.

Both LTE and 5G enable communications between a network and a user device, where an air interface is the radio frequency portion of the circuit between the user device and the network. LTE protocols may be typically deployed using frequency domain duplexing technology, where for a brief overview, up-link and downlink signals are assigned certain frequencies of bandwidth to facilitate communication between the user device and the network. Whereas, 5G protocols may be typically deployed using time domain duplexing technology, where for a brief overview, up-link and downlink signals are assigned timeslots for broadcast or receiving to facilitate communication between the user device and the network.

Figure 2:
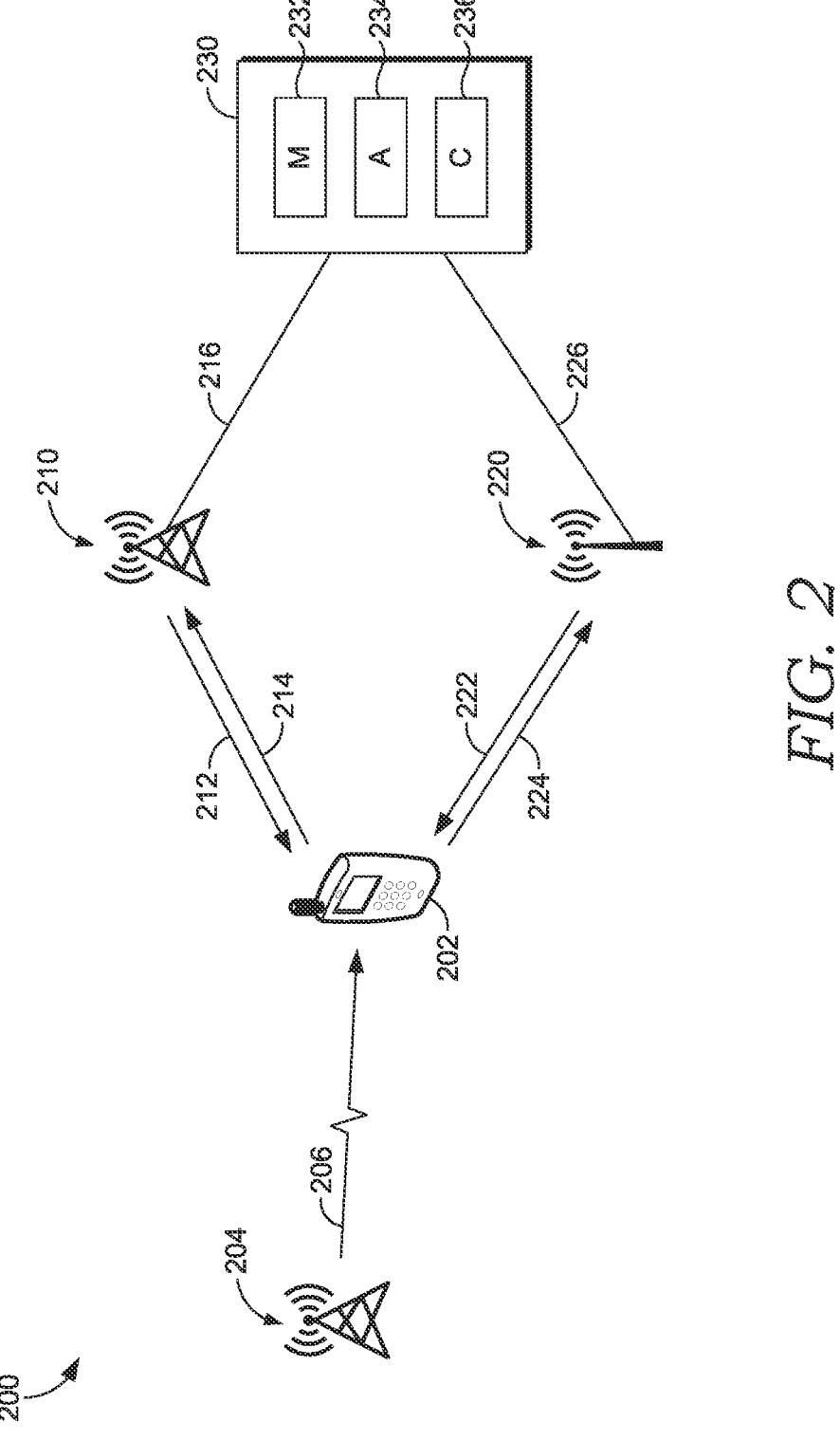
FIG. 2 depicts a network environment in which implementations of the present disclosure may be employed, in accordance with aspects herein.

Turning now to FIG. 2, an exemplary network environment is illustrated in which implementations of the present disclosure may be employed. Such a network environment is illustrated and designated generally as network environment 200. At a high level the network environment 200 comprises a UE 202, one or more base stations, and one or more networks. Though the UE 202 is illustrated as a cellular phone, a UE suitable for implementations with the present disclosure may be any computing device having any one or more aspects described with respect to FIG. 1. Similarly, though the one or more base stations are illustrated as macro cells on a cell tower, any scale or form of access point acting as a transceiver station for wirelessly communicating with a UE, including small cells, pico cells, and the like, are suitable for use with the present disclosure. The network environment 200 is but one example of a suitable network environment and is not intended to suggest any limitation as to the scope of use or functionality of the disclosure. Neither should the network environment 200 be interpreted as having any dependency or requirement to any one or combination of components illustrated.

The network environment 200 comprises one or more base stations to which the UE 202 may potentially connect to (also referred to as 'camping on', 'attaching' in the industry). Though the network environment 200 is illustrated with three distinct base stations, one skilled in the art will appreciate that more or fewer base stations may be present in any particular network environment suitable for use with the present disclosure. The one or more base stations of network environment 200 may comprise one or more of an aggressor base station 204, a victim base station 210, and a supplemental base station 220. Each of the one or more base stations of the network environment 200 is configured to wirelessly communicate with UEs, such as the UE 202. In aspects, any of the one or more base stations may communicate with a UE using any wireless telecommunication protocol desired by a network operator, including but not limited to 3G, 4G, 5G, 6G, 802.11x and the like. Relevant to the present disclosure, each of the one or more base stations is associated with a network identifier (e.g., a Public Land Mobile Network (PLMN) number). Each of the one or more base stations may be generally said to be configured to communicate with one or more UEs located within a geographical area. A geographical area for any particular base station may be referred to as the "coverage area" of the base station or simply as a "cell." In some aspects, each cell is defined by an area in which signaling between a particular UE and the base station is usable for any purpose. Each of the base stations of the network environment 200 may be used to provide coverage to a plurality of cells, wherein one or more of the plurality of cells at least partially overlap; for example, the victim base station 210 may provide coverage to a first cell and a second cell, wherein the first cell and the second cell at least partially overlap. Generally, each base station of the one or more base stations may comprise one or more base transmitter stations, radios, antennas, antenna arrays, power amplifiers, transmitters/receivers, digital signal processors, control electronics, GPS equipment, and the like.

In some aspects, each of the base stations may utilize a plurality of cells, wherein the cells are operating using the same telecommunications protocol. For example, the victim base station 210 may operate using a plurality of cells using only a single RAT, such as TDD. In further example, the victim base station 210 may operate using a TDD protocol when the supplemental base station 220 may operate using FDD. In other aspects, each of the base stations may utilize a plurality of cells, wherein the cells are operating using a plurality of telecommunication protocols as desired by the network. For example, the victim base station 210 may utilize a first cell providing coverage using a first RAT and a second cell using providing coverage using a second RAT. The coverage of the first cell and the second cell may be substantially similar in coverage area and overlap. The first and second cells may be located on the same transmitter station ("tower") or may be geographically separated but controlled by the victim base station 210. For example, the victim base station may have the first cell which operates using TDD and the second cell which operates using FDD. In some aspects, the victim base station 210 may have cells using a single RAT and the supplemental base station 220 and/or the aggressor base station 204 may have cells operating with a plurality of RAT. In example, the victim base station 210 may have cells only capable of using TDD, whereas the supplemental cell 220 has at least a first cell capable of operating in TDD and a second cell capable of operating in FDD. The aggressor base station 204 and the victim base station 210 may operate using at least one of the same telecommunication protocols, such as Time Domain Duplexing.

Each base station of the network environment 200 is configured to transmit downlink signals to one or more UEs, such as the UE 202 and to receive uplink signals therefrom. For the purposes of network environment 200, the victim base station 210 transmits downlink signals on a first downlink 212, the supplemental base station 220 transmits downlink signals on a second downlink 222, the victim base station 210 receives uplink signals on a first uplink 214, the supplemental base station 220 receives uplink signals on a second uplink 224, and the aggressor base station transmits downlink signals on a third downlink 206. Downlink signals from a particular base station may comprise one or more sets of synchronization signals that serve to provide information about that particular base station, such as primary synchronization signals (PSS), secondary synchronization signals (SSS), and physical broadcast channel (PBCH) signals. The downlink signals may additionally comprise various other control and broadcast signaling in addition to physical downlink shared channel (PDSCH) signaling. As used herein, the term synchronization signals comprises any one or more messages or signaling used by a base station, such as the victim base station 210 and the supplemental base station 220, to provide the UE 202 with information used to perform cell search and cell selection/reselection (referred to as "cell selection" herein); synchronization signals comprise the master information block (MIB) and any one or more system information block (SIB).

The victim base station 210 may communicate essential information to the UEs 202 through the MIB. The MIB carries critical network information that allows UE 202 to synchronize with the victim base station 210 and acquire basic network parameters. The MIB is broadcasted by the base station in LTE networks periodically. The periodic term may be about every 40 ms. The UE 202 monitors the MIB broadcast to synchronize their timing with the base station and acquire the necessary information to access the network. A key piece of information communicated to UEs 202 from the victim base station 210 using the MIB is a reference to one or more SIBs.

The one or more SIBs may be used to carry messages or have a flag placed within a message to provide key information to the UE 202. For example, the one or more SIBs may contain information related to radio access technology (RAT) parameters. RAT parameters may inform the UE 202, regarding which radio access technology is being used by the victim base station 210 (e.g., TDD or FDD, 4G or 5G, and the like). Though the UE 202 may be connected to the network using one radio access technology, such as TDD, the SIBs may communicate instructions from the victim base station 210 to the UE that cause the UE to shift (i.e., handover) to a cell with a different radio access technologies. For example, the UE 202 may be connected to the network through the victim base station 210 using TDD, when the victim base station 210 instructs the UE 202 to connect to the network using a dual-connectivity mode, which may utilize both TDD and FDD radio access technologies. The one or more SIBs comprise numerous fields, relevantly including a RAT parameters, a cell selection and reselection parameters, a radio resource allocation, a system bandwidth, and a quality of service information. In some aspects, the SIB type 2 block (SIB2) may be used to communicate instructions to shift RAT.

Network environment 200 includes user equipment (UE) 202 configured to wirelessly communicate with the one or more base stations of the network environment 200. The UE 202 may take on a variety of forms, such as a personal computer (PC), a user device, a smart phone, a smart watch, an extended reality (XR) device, Internet of Things (IoT) device, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device that comprising any one or more feature of computing device 100 of FIG. 1.

In order to connect to a base station, the UE 202 may be able to use a variety of radio access technologies such as 5G and LTE. The UE 202 may operate using one or more of the radio access technologies at once. In one aspect, the UE 202 may operating using multiple radio access technologies, also known as a non-standalone (NSA) mode. One such RAT method may be known as E-UTRAN New Radio-Dual Connectivity (hereinafter "ENDC"), which allows dual connectivity to both the LTE network and 5G network. The ENDC technology may allow the UE 202 to connect to the LTE network for signaling and status communications and also connect to the 5G network and radio technology to enable faster uplink and downlink speeds and additional bandwidth. In another aspect, the UE 202 may be operating using a single radio access technology, also known as a standalone (SA) mode, where data, messaging, and signaling are provided using the same radio access technology. For example, the UE 202 may be connected to the network via the victim base station 210 using only 5G radio access technology. When the UE 202 and the victim base station 210 are communicating in the standalone mode the signaling, messaging, and data.

The network environment 200 additionally comprises one or more hardware and/or software components that, together, make up a time of flight (TOF) mitigation engine 230. The TOF mitigation engine 230 may be said to comprise a monitor 232, an analyzer 234, and a controller 236. The monitor 232 is generally configured to determine that TOF interference is taking place and affecting the ability of the UE 202 to utilize the victim base station 210. Specifically, the UE 202 may be having trouble communicating with one or more of a victim cell on the victim base station 210. The analyzer 234 is generally configured to determine that the UE 202 is capable of connecting to the network using FDD technology either through the victim base station 210 or in the alternative the supplemental base station 220. The controller 236 may be generally configured to modify and communicate one or more synchronization signals from one or more of the victim base station 210 and the supplemental base station 220 to the UE 202 that cause the UE 202 to shift modes from TDD technology to communicate at least in part using FDD technology. The UE 202 may communicate using FDD technology to the victim base station 210 or the supplemental base station 220. For example, the UE 202 may be instructed to shift form (or tune away) from the victim cell, at least in part, by utilizing a second cell located on either the victim base station 210 or the supplemental base station 220. The controller 236 may be generally configured to modify and communicate one or more synchronization signals from one or more of the victim base station 210 and the supplemental base station 220 to the UE 202 that cause the UE 202 to return to TDD technology wireless communications.

Figure 3:
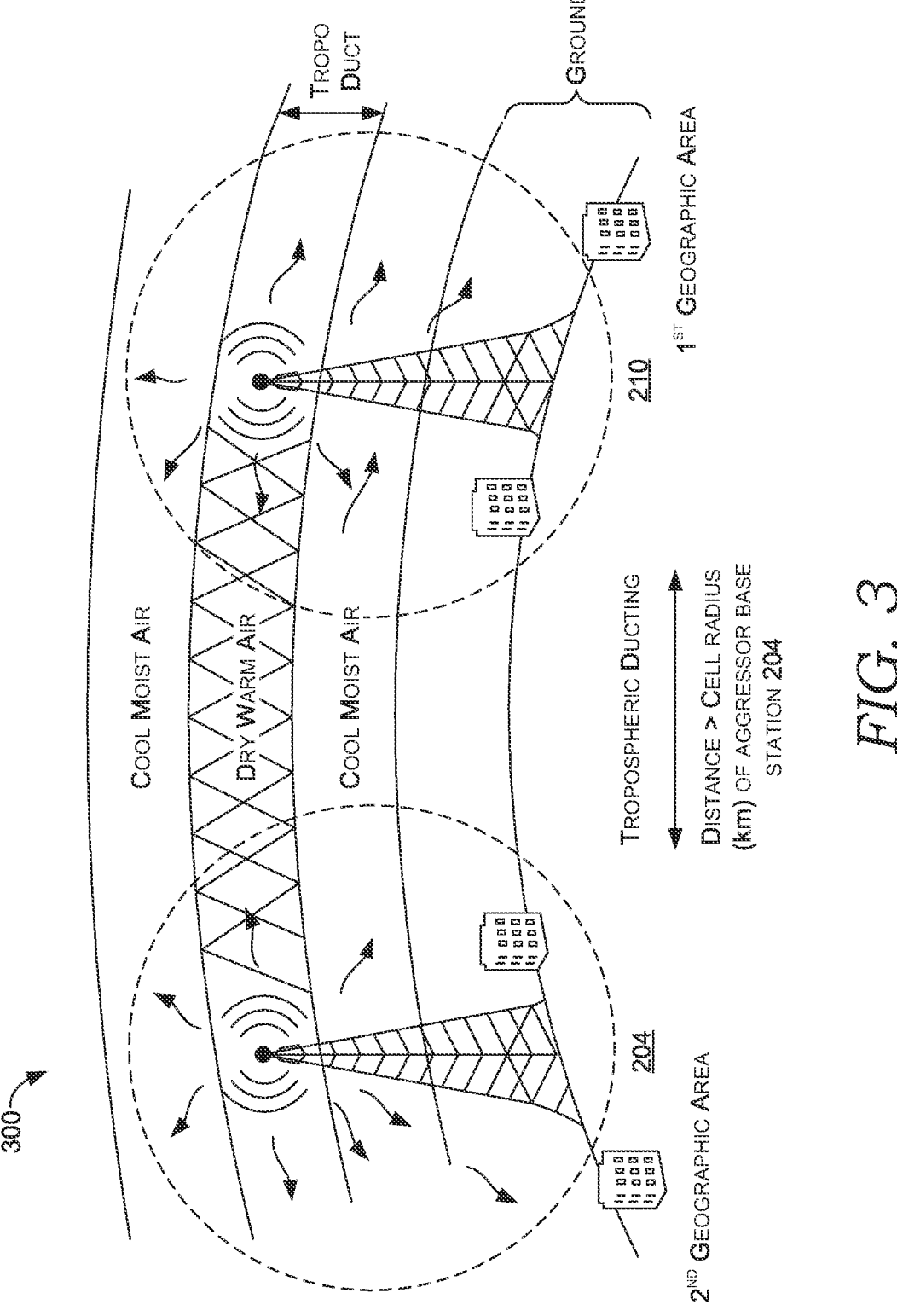
FIG. 3 depicts a diagram of tropospheric ducting occurring in a network environment.

The monitor 232 is generally configured to determine that TOF interference is taking place in a first geographic region, in which the UE 202 is located. Any suitable means for determining the existence of TOF interference would be suitable for use with the present disclosure, including the use of tropospheric ducting forecasts, observations of the third downlink 206 comprising a cell identifier of the aggressor base station 204 (combined with a determination that the aggressor base station 204 is located greater than a predetermined threshold distance from the victim base station 210), or by determining that a signal parameter is sufficiently different at a first portion of an uplink time period (e.g., an uplink subframe) when compared to a second, later, portion of the uplink time period. An illustration of tropospheric ducting is presented in FIG. 3. As shown, there is a network environment 300 where the aggressor base station 204 of FIG. 2 may be located in a second geographic region and may broadcast radio frequency signals, which become trapped in a layer or duct of dry, warm air positioned in between layers of cool, moist air. These radio frequency signals travel a greater distance than intended, beyond the cell radius of the aggressor base station 204, to the victim base station 210, located in the first geographic region. When signals from the aggressor base station 204 are of sufficiently proximate frequencies, they can cause interference at the victim base station 210, particularly when the victim base station 210 utilizes TDD and the downlink signals from the aggressor base station 204 arrive during an uplink time period of the victim base station 210. That is, as the victim base station 210 may realize noise from the downlink signals of the aggressor base station 204 when the victim base station 210 is scheduled to be receiving uplink signals from a UE.

Returning to FIG. 2, the monitor 232 may determine that TOF interference is affecting the victim base station 210 based on one or more signal parameters being sufficiently different during different portions of an uplink time period (e.g., an uplink subframe). The monitor 232 may utilize observations of the one or more signal parameters by the victim base station 210 or measurement reports from one or more UEs within a predetermined threshold distance of the victim base station 210. The one or more signal parameters may comprise a signal strength, signal quality, or noise value (e.g., signal to interference noise ratio (SINR)). The monitor 232 may utilize a first observation of the one or more signal parameters at a first point in the uplink time period. In aspects, the first point in the uplink time period may be a configurable threshold amount of time from the beginning of the uplink time period. The monitor may compare the first observation to a second observation of the one or more signal parameters at a second point in the uplink time period. In aspects, the second point in the uplink time period is subsequent to the first point and may be a configurable threshold amount of time from the end of the uplink time period. For example, if the uplink time period is 10 ms, the first point may be 1 ms after the start of the uplink time period and the second point may be 8 ms after the start of the uplink time period. If one or more values of the one or more signal parameters at the first point are within a threshold range of the one or more values of the one or more signal parameters at the second point, the monitor 232 may determine that TOF interference is not occurring (or that it cannot be mitigated). If, on the other hand, the one or more values are beyond the threshold range, the monitor 232 may determine that TOF interference is occurring and communicate such an indication to the analyzer 234. In one non-limiting example, the one or more signal parameters may be SINR and the monitor 232 may compare the SINR at 1 ms and 8 ms in to a 10 ms uplink subframe. If the predetermined threshold range is 10 dB, a SINR of 5 dB is observed in the first geographic area at 1 ms, and a SINR of 20 is observed in the first geographic area at 8 ms, then the monitor 232 may determine that TOF interference is affecting the victim base station 210; conversely, if the SINR in the first geographic area is observed at 5 dB at 1 ms and 10 dB at 8 ms, then the monitor 232 may determine that TOF interference is not occurring (or it cannot be mitigated), and no further action will be taken by the TOF mitigation engine 230.

The analyzer 234 is generally configured to determine that a TOF mitigation procedure is available for the UE 202. The analyzer 234 receives an indication from the monitor 232 that TOF interference may be occurring in the first geographic area and determines that one or more of the cells at the victim base station 210 utilizes TDD to communicate with at least some of the UEs in the first geographic area. For example, victim base station 210 may have at least one cell which utilizes TDD technologies, which may employ 5G. In some aspects, the analyzer 234 may further determine that one or more of the cells of the victim base station 210 may configured to operate utilizing FDD to communicate with the UEs in the first geographic area. For example, the victim base station 210 may have a first cell using TDD and a second cell using FDD. In one example, the victim base station 210 may have the first cell configured to operate 5G using TDD and the second cell configured to operate LTE using FDD. In other aspects, the analyzer 234 may further determine that the victim base station 210 does not have a cell configured to operate using FDD, however the supplemental base station 220 may have a cell configured to operate utilizing FDD to communicate with UEs in at least a portion of the first geographic area. For example, the victim base station 210 may only have cells configured to utilize TDD, whereas the supplemental base station 220 may have cells configured to utilize FDD and may have cells configured to utilize TDD.

In one aspect, the analyzer 234 may then communicate an indication to the controller 236 that one or more synchronization signals of the first downlink 212 may be modified in order to instruct the UE 202 to shift radio access technologies from standalone TDD to at least partially use FDD, such as in ENDC mode. In aspects where the analyzer 234 determined the victim base station 210 may be capable of using FDD technology (where one of more of the cells may utilize FDD technology), the UE 202 may be instructed to shift to into a dual connectivity mode, such as ENDC, and remain connected to the victim base station 210 using cells providing FDD and TDD radio access technologies. In an example, the victim base station 210 may have at least a 5G cell operating with TDD and an LTE cell operating with FDD. Continuing with the example, the controller 236 may instruct the UE 202 though synchronization signals to shift into ENDC mode, where the UE 202 utilizes both 5G (operating in TDD) and LTE (operating in FDD). The UE 202 may remain connected to the victim base station 210 through both the 5G and LTE cells.

In aspects where the analyzer 234 determines that the victim base station 210 may not be configured to operate using FDD, the UE 202 may be instructed to shift to at least partially use FDD, where the FDD communications may come from the supplemental base station 220. For example, the UE 202 may be instructed to shift into ENDC mode and connect to the LTE network using the supplemental base station 220, which has an LTE cell using FDD technology. In another example, the UE 202 may be connected to the victim base station 210 utilizing standalone mode 5G radio access technology, where the victim base station 210 may only have 5G cells or may have limited LTE resources (i.e. cells at capacity). In such example, the analyzer 234 may instruct the UE 202 to connect to the supplemental base station 220 by FDD technology (such as LTE), where the supplemental base station 220 may include a non co-located FDD cell covering part of the same geographic area as the victim base station. In other examples, the supplemental base station 220 may be a base station capable of transmitting using both FDD and TDD, and may be configured to transmit to a portion of the first geographic area where the UE 202 is located.

In another aspect, the UE 202 may receive signals from the victim base station 210 or the supplemental base station 220 instructing the UE 202 to shift to at least partially using FDD technology. This may occur, where the victim base station 210 ceases transmitting signaling instructions through TDD technology. The analyzer 234 may then communicate an indication to the controller 236 that one or more synchronization signals of the first downlink 212 or the second downlink 222 may be modified in order to instruct the UE 202 to at least partially shift radio access technologies from TDD to FDD. For example, the UE 202 may continue to use standalone 5G technology with the cells of the victim base station 210, the victim base station 210 may cease signally through 5G, forcing the UE 202 to search for synchronization signals, where the UE 202 receives synchronization signals from the supplemental base station through LTE technology.

In other aspects, the analyzer 234 may determine based on network resources or UE 202 demands on the resources that UE 202 may be best served in an FDD standalone mode. The analyzer 234 may then communicate an indication to the controller 236 that one or more synchronization signals of the first downlink 212 or the second downlink 222 may be modified in order to instruct the UE 202 to shift radio access technologies from the dual link mode using FDD and TDD to standalone FDD. For example, the UE 202 may be communicating to the victim base station 210 and/or supplemental base station 220 in ENDC mode, utilizing both LTE and 5G, and be instructed by the synchronization signal to shift radio access technologies to a standalone LTE mode. In this example, the UE 202 may retain the LTE connection with either the victim base station 210 or the supplemental base station 220 and release the 5G connection with the victim base station 210.

The controller 236 is generally configured to receive indications from the analyzer 234 and instruct one or more base stations to communicate modified synchronization signals. In order to cause UEs to shift from one radio access technology to another (i.e. TDD to FDD) the controller may instruct the victim base station 210 to modify one or more values of their respective synchronization signals. In one aspect, the controller 236 may instruct the victim base station 210 to modify one or more values of the first downlink's 212 synchronization signals by indicating to the UE 202 that the victim base station 210 is operating in a dual mode using TDD and FDD (i.e. ENDC). In another aspect, the controller may instruct the victim base station 210 to cease transmitting synchronization signals using TDD technology and shift to transmitting synchronization signals using FDD. The UE 202, after failing to receive synchronization signals for a threshold time, using TDD technology may independently activate FDD antennae(s) on the UE 202 in order to detect synchronization signals that may be broadcasting from the victim base station 210. The threshold time may be a definite amount of time or may be determined after a number of failed attempts to receive synchronization signals.

Subsequent to the UE 202 shifting modes to operating in a dual mode using TDD and FDD or standalone FDD, the TOF mitigation engine 230 may continue to determine whether TOF interference is taking place. If TOF interference has ceased or reduced below a threshold level, the TOF mitigation engine may instruct the UE 202 that standalone TDD technologies, such as standalone 5G, are available. As discussed above, the TOF mitigation engine 230 may be said to comprise a monitor 232, an analyzer 234, and a controller 236. The monitor 232 may be generally configured to determine that TOF interference is no longer taking place in the first geographic area in which the UE 202 is located and is no longer a threat to the ability of the UE 202 to utilize the victim base station 210. The analyzer may be generally configured to determine that the UE 202 has connected through at least one mode to the supplemental base station 220 and is capable of connecting back to the victim base station 210. The controller 236 may be configured to modify and communicate one of more synchronization signals from one or more of the victim base station 210 and the supplemental base station 220 to the UE 202 to cause the UE 202 to recognize the victim base station 210 has standalone TDD capability and availability, allowing the UE 202 to shift back to the victim base station 210 for standalone TDD communications.

FIG. 4 depicts a flow diagram of a first method for mitigating tropospheric ducting through UE 202 mode switching in accordance with aspects herein. The method 400 begins with block 402 determining that time of flight interference is occurring during an uplink subframe of a victim cell, wherein the victim cell use time domain duplexing to wirelessly communicate with a UE in a geographic area served by the victim cell. The method continues with block 404, based on said determination, communicating a first set of modified synchronization signals to the geographic area served by the victim cell, the one or more modified synchronization signals comprising instructions for the UE to at least partially communicate with the network using frequency domain duplexing. The method completes at block 406, where based on the instructions, the UE shifts at least a portion of the wireless communications with the network to using frequency domain duplexing.

FIG. 5 depicts a flow diagram of an exemplary method for mitigating tropospheric ducting through UE 202 mode switching in accordance with aspects herein. The method 500 begins with block 502 determining that time of flight interference is occurring during an uplink subframe of a victim cell, wherein the victim cell use time domain duplexing (TDD) to wirelessly communicate with a UE in a geographic area served by the victim cell. The method continues with block 504, based on said determination, the victim cell ceases broadcasting synchronization signals with the UE in a geographic area using TDD. At block 506, the victim cell wirelessly broadcasts synchronization signals to the geographic area using frequency domain duplexing (FDD), which includes instructions for the UEs to at least partially use FDD. At block 508, after a threshold time has passed the UE searches for signaling broadcasts using FDD and receives the synchronization signals from the victim cell.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for mitigating interference caused by a meteorological condition known as tropospheric ducting in a wireless telecommunication network, the method comprising:

determining that time of flight interference is occurring during an uplink subframe of a victim cell, wherein the victim cell uses time domain duplexing (TDD) to wirelessly communicate with a UE in a geographic area served by the victim cell; and, based on said determination, communicating a first set of signals to the geographic area served by the victim cell, the first set of signals comprising one or more instructions that causes the UE to handover from a standalone TDD connection to a dual mode connection using both TDD and frequency domain duplexing (FDD) to wirelessly communicate while in the geographic area.

2. The method of claim 1, wherein the victim cell is configured to wirelessly communicate with the UE using the dual mode operating using both TDD and FDD.

3. The method of claim 1, wherein the victim cell is configured to wirelessly communicate with the UE using only TDD mode.

4. The method of claim 3, wherein causing a supplemental cell, also having coverage in the geographic area, to wireless communicate with the UE using FDD.

5. The method of claim 1, wherein the first set of signals comprises a system information block message.

6. The method of claim 1, wherein the method further comprises communicating, by a supplemental cell, a second set of signals comprising a set of instructions to use only FDD to communicate wirelessly in the geographic area.

7. The method of claim 6, wherein determining that time of flight interference comprises determining one or more parameters of an air interface during each of a first portion of the uplink subframe and a second portion of the uplink subframe.

8. The method of claim 7, wherein the first portion of the uplink subframe is within a first configurable threshold time of the beginning of the uplink subframe and the second portion of the uplink subframe is within a second configurable threshold time of an end of the uplink subframe.

9. The method of claim 8, wherein the one or more parameters of the air interface comprises a signal strength.

10. The method of claim 8, wherein the one or parameters of the air interface comprises a signal to noise interference noise ratio (SINR).

11. The method of claim 1, wherein the UE uses TDD on a fifth-generation technology standard cellular network (5G).

12. The method of claim 1, wherein the UE uses FDD using a Long-Term Evolution (LTE) cellular network.

13. A system for mitigating interference caused by a meteorological condition known as tropospheric ducting in a wireless telecommunication network, the system comprising:

one or more non-transitory computer readable media having instructions stored thereon that, when executed by one or more computer processing components, cause the one or more computer processing components to perform operations comprising:

determining that time of flight interference is occurring during an uplink subframe of a victim cell, wherein the victim cell uses time domain duplexing (TDD) to wirelessly communicate with a UE in a geographic area served by the victim cell; and, based on said determination, communicating a signal to the geographic area served by the victim cell, the signal comprising one or more instructions that causes the UE to shift to at least partially communicate with the network using frequency domain duplexing (FDD) while in the geographic area.

14. The system of claim 13, wherein causing the UE to shift to using FDD to wirelessly communicate while in the geographic area causes the UE to connect to a supplemental cell.

15. The system of claim 14, wherein the signal comprises instructions to connect to the supplemental cell.

16. The system of claim 13, wherein determining that time of flight interference comprises determining one or more parameters of an air interface during each of a first portion of the uplink subframe and a second portion of the uplink subframe.

17. A non-transitory computer readable media having instructions stored thereon that, when executed by one or more computer processing components, cause the one or more computer processing components to perform a method for mitigating interference caused by a meteorological condition known as tropospheric ducting in a wireless telecommunication network, the method comprising:

determining that time of flight interference is occurring during an uplink subframe of a victim cell, wherein the victim cell uses time domain duplexing (TDD) to wirelessly communicate with a UE in a geographic area served by the victim cell; and, based on said determination, communicating a first set of signals to the geographic area served by the victim cell, the first set of signals comprising one or more instructions that causes the UE to handover from a standalone TDD connection to a dual mode connection using TDD and frequency domain duplexing (FDD).

18. The computer readable media of claim 17, wherein the computer readable media further comprises, transmitting a second set of signals instructing the UE to communicate wirelessly in the geographic area using a standalone mode using FDD.

19. The computer readable media of claim 18, wherein the computer readable media further comprises, determining that the time of flight interference has ceased and transmitting a third set of signals instructing the UE to communicate with the victim cell in a standalone using TDD.

20. The computer readable media of claim 18, wherein the first set of signals comprises a system information block (SIB) message.

* * * * *